US009990653B1

(12) United States Patent
Lewis et al.

(10) Patent No.: US 9,990,653 B1
(45) Date of Patent: Jun. 5, 2018

(54) SYSTEMS AND METHODS FOR SERVING ONLINE CONTENT BASED ON USER ENGAGEMENT DURATION

(71) Applicant: GOOGLE INC., Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 536 days.

(21) Appl. No.: 14/673,377

(22) Filed: Mar. 30, 2015

Related U.S. Application Data (60) Provisional application No. 62/056,991, filed on Sep. 29, 2014.

(51) Int. Cl.
*G06Q 30/02* (2012.01)
(52) U.S. Cl.
CPC ............... *G06Q 30/0255* (2013.01)
(58) Field of Classification Search
CPC .................................................. G06C 30/0255
See application file for complete search history.

(56) References Cited

U.S. PATENT DOCUMENTS

| | | | | |
|---|---|---|---|---|
| 8,169,916 B1* | 5/2012 | Pai | ............... | H04N 21/2181 370/236 |
| 9,094,735 B1* | 7/2015 | Abdalla | ............... | H04N 21/812 |
| 9,117,227 B1* | 8/2015 | Agrawal | ............ | G06Q 30/0242 |
| 9,219,790 B1* | 12/2015 | Filev | ............... | H04L 67/22 |
| 9,872,082 B1* | 1/2018 | Abdalla | ............... | H04N 21/812 |
| 2003/0149975 A1* | 8/2003 | Eldering | ............ | H04N 7/17318 725/34 |
| 2003/0187730 A1* | 10/2003 | Natarajan | ............... | G06Q 30/02 705/14.68 |
| 2007/0156838 A1* | 7/2007 | Kocho | ............... | G06O 30/02 709/217 |
| 2007/0250901 A1* | 10/2007 | McIntire | ............ | H04N 7/17318 725/146 |
| 2007/0265918 A1* | 11/2007 | McMahon | ............... | G06Q 30/02 705/14.41 |
| 2008/0059390 A1* | 3/2008 | Cox | ............... | G06O 30/02 706/12 |
| 2008/0195468 A1* | 8/2008 | Malik | ............... | G06O 30/02 705/14.53 |
| 2008/0307454 A1* | 12/2008 | Ahanger | ............... | G06Q 30/02 725/36 |

(Continued)

*Primary Examiner* — Jacob C. Coppola
(74) *Attorney, Agent, or Firm* — Foley and Lardner LLP (57) ABSTRACT

An engagement time computer system for serving online content based on user engagement duration includes an output device, at least one memory, and one or more processors. The processors are configured to determine a historical engagement time of an online user and to identify a plurality of online content items. Each online content item of the plurality of online content items has a target engagement time. The processors are further configured to receive a request for a content item. The request is associated with the online user. The processors are also configured to select a first online content item from the plurality of online content items based at least in part on the historical engagement time of the online user and the target engagement time of the first online content item and to transmit the first online content item for display to the online user.

20 Claims, 6 Drawing Sheets

(56) References Cited

U.S. PATENT DOCUMENTS

| | | | |
|---|---|---|---|
| 2009/0204478 A1* | 8/2009 | Kaib | G06Q 30/02 |
| | | | 705/7.29 |
| 2010/0306039 A1* | 12/2010 | Green | G06O 30/02 |
| | | | 705/14.4 |
| 2011/0029393 A1* | 2/2011 | Apprendi | G06Q 30/0277 |
| | | | 705/14.73 |
| 2011/0145069 A1* | 6/2011 | Tauriainen | G06Q 30/02 |
| | | | 705/14.56 |
| 2011/0208585 A1 | 8/2011 | Daboll et al. | |
| 2011/0258039 A1 | 10/2011 | Patwa et al. | |
| 2011/0313817 A1* | 12/2011 | Wang | G06Q 10/06393 |
| | | | 705/7.39 |
| 2012/0323675 A1* | 12/2012 | Paparo | G06O 30/0242 |
| | | | 705/14.42 |
| 2013/0054484 A1 | 2/2013 | Hoeflinger et al. | |
| 2013/0104024 A1* | 4/2013 | Rajkumar | G06F 17/30899 |
| | | | 715/234 |
| 2013/0124298 A1 | 5/2013 | Li et al. | |
| 2013/0254787 A1* | 9/2013 | Cox | G06Q 30/02 |
| | | | 725/13 |
| 2014/0006176 A1* | 1/2014 | Gudlavenkatasiva | G06Q 30/02 |
| | | | 705/14.73 |
| 2014/0089080 A1* | 3/2014 | Tajima | G06O 30/0251 |
| | | | 705/14.41 |
| 2014/0129325 A1* | 5/2014 | Zinger | G06Q 30/0241 |
| | | | 705/14.46 |
| 2014/0130076 A1* | 5/2014 | Moore | H04N 21/25883 |
| | | | 725/19 |

* cited by examiner

SYSTEMS AND METHODS FOR SERVING ONLINE CONTENT BASED ON USER ENGAGEMENT DURATION

CROSS-REFERENCE TO RELATED APPLICATION

This application claims the benefit of U.S. Provisional Patent Application No. 62/056,991 filed on Sep. 29, 2014, which is hereby incorporated by reference herein in its entirety.

BACKGROUND

This specification relates to presenting online content to a user and, more particularly, to a system and method for serving online content to the user based on a historical duration of engagement by the user with other online content.

Internet users and other consumers of online content are presented with publications such as a news article on a publisher's a web page. This primary content may also be presented alongside one or more online content items such as online advertisements. In some known systems, users may engage with the online content items for different durations of time before, for example, navigating away from the online content items.

BRIEF DESCRIPTION OF THE DISCLOSURE

In one aspect, an engagement time computer system for serving online content based on user engagement duration is provided. The engagement time computer system includes an output device, at least one memory, and one or more processors. The one or more processors are configured to determine a historical engagement time of an online user. The one or more processors are also configured to identify a plurality of online content items. Each online content item of the plurality of online content items has a target engagement time. The one or more processors are further configured to receive a request for a content item. The request is associated with the online user. The one or more processors are also configured to select a first online content item from the plurality of online content items based at least in part on the historical engagement time of the online user and the target engagement time of the first online content item. The one or more processors are further configured to transmit the first online content item for display to the online user.

In another aspect, a computer-implemented method for serving online content based on user engagement duration is provided. The method uses an engagement time module computing device including a processor and a memory. The method includes determining a historical engagement time of an online user. The method also includes identifying a plurality of online content items. Each online content item of the plurality of online content items has a target engagement time. The method further includes receiving a request for a content item. The request is associated with the online user. The method also includes selecting, by the processor, a first online content item from the plurality of online content items based at least in part on the historical engagement time of the online user and the target engagement time of the first online content item. The method further includes transmitting the first online content item for display to the online user.

In yet another aspect, computer-readable storage media having computer-executable instructions embodied thereon are provided. When executed by at least one processor, the computer-executable instructions cause the processor to determine a historical engagement time of an online user. The computer-executable instructions also cause the processor to identify a plurality of online content items. Each online content item of the plurality of online content items has a target engagement time. The computer-executable instructions further cause the processor to receive a request for a content item. The request is associated with the online user. The computer-executable instructions also cause the processor to select a first online content item from the plurality of online content items based at least in part on the historical engagement time of the online user and the target engagement time of the first online content item. The computer-executable instructions further cause the processor to transmit the first online content item for display to the online user.

BRIEF DESCRIPTION OF THE DRAWINGS

FIGS. 1-6 show example embodiments of the methods and systems described herein.

Like reference numbers and designations in the various drawings indicate like elements.

DETAILED DESCRIPTION OF THE DISCLOSURE

Embodiments of the methods and systems described herein enable advertisers to more meaningfully provide online content items (e.g., advertisements) to a consuming user (i.e., the user to whom the ad is served). An online Content Management System (CMS) manages one or more aspects of online content presentation to the consuming user. For example, the CMS may present video ads to online users during their online experience. During the presentation of these video ads, the consuming user engages with (e.g., watches) the ad for a period of time, but may disengage or abandon the ad prior to its completion. Further, the user may abandon the ad prior to an important point (i.e., key messaging point) in the ad, and thus the advertiser's message may not have been completely delivered.

The CMS in the example systems and methods described herein includes or is in communication with an Engagement Time Module (ETM) that selects online content items (e.g., ads) for the consuming user based on that user's historical engagement times (e.g., how long that user tends to engage with certain online ads). The ETM determines engagement duration, or a "historical engagement time", associated with the consuming user over the course of past historical viewings. For example, the ETM may determine that a first user views ads for an average of 30 seconds before abandonment, while a second user views ads for only 10 seconds before abandonment. Moreover, the ETM may determine that the first user has an average viewing time of 40 seconds when viewing sports-related ads. Thus, the historical engagement time may be relative to a particular type of advertisement or particular subject matter of the advertisement. In some embodiments, the system stores the user's engagement time with content items in an anonymized form. In at least some embodiments, a user has the option to consent to or decline having the system store their engagement time with content items.

The ETM also allows advertisers to specify, for a particular ad, a "target engagement time" within that ad. The "target engagement time", generally speaking, indicates a point at which the optimal component, idea, or message ("key messaging point") of the advertiser's ad has been delivered. For example, a shoe manufacturer may have a 30-second ad for a pair of shoes. At the 10-14 second mark within the ad, the ad presents the pair of shoes being worn by a famous athlete. The advertiser may determine that this is the key messaging point of the 30-second ad for a majority of consumers and, as such, if a viewer watches the ad through the famous athlete section (e.g., past the 14-second mark), then that viewer has received the most important content in the advertisement. The ETM enables advertisers to configure and store a target engagement time (e.g., 14 seconds) for each particular ad (the "target engagement time" being at least some time after the key messaging point).

During online activity, a consuming user may request a video to watch. By inputting such a request, another request is also inputted by the consuming user, the other request being a request for an online content item, such as an ad that will be displayed prior to watching a video sought by the user. The ETM selects an online content item by comparing the user's historical engagement time to the target engagement times of a pool of online content items. More specifically, the ETM selects an online content item having a target engagement time near the user's historical engagement time. For example, the ETM may select an ad with a target engagement time of 28 seconds for a user that has a 30-second historical engagement time, and may select an ad with a target engagement time of 11 seconds for another user that has a 13-second historical engagement time. As such, the particular impression or display of each ad to each particular user is more likely to generate a complete engagement, or a viewing through the important point in the ad.

In some embodiments, content items are categorized into ad types or other groupings, and the ETM determines a historical engagement time for the online user that is particular to that ad category or type. For example, one online user may have a historical engagement time for "golf" related ads of 30 seconds, but may only have a historical engagement time for "shoe" related ads of 10 seconds. The ETM may compare candidate "golf" type ads (and their respective target engagement times) to candidate "shoe" type ads (and their respective target engagement times) to determine which ad is most likely to be fully consumed by that particular online user. In other embodiments, the ETM determines a cost for providing the ad that is based on how long the user actually engaged with the provided ad.

As used herein, the term "engagement" is used generally and broadly to refer to how a user interacts with or views content items and/or publications. For example, a user may be said to engage with an online publication when they read the contents, or view an included ad, or click on an element within the publication. The term "engagement time" is used generally to refer to a length of time a user engages with (e.g., views or consumes) an online content item. For example, a user that watches a 30-second video ad for 14 seconds is said to have an engagement time with that ad of 14 seconds.

As used herein, the term "consumption" is used generally and broadly to refer to an aspect of engagement associated with a content item and/or a publication. For example, a user may be said to consume an online publication if they read all of the words contained within that publication. Further, a user may be said to fully consume an online content item if they consume the item for a minimum amount of time (e.g., the "target engagement time", as specified by the creating advertiser).

At least one of the technical problems addressed by this system includes: (i) abandonment or partial consumption of online content items; (ii) serving online content items to users that do not consume the most important information within the online content items; and (iii) charging advertisers without consideration of user engagement. Other technical problems may include increased network usage (slowing down the network) due to the over-serving of online content items that may be only partially consumed by consuming users. Certain embodiments described herein may address one or more of these technical problems.

The methods and systems described herein may be implemented using computer programming or engineering techniques including computer software, firmware, hardware, or any combination or subset thereof, wherein the technical effects may be achieved by performing at least one of the following steps: (a) determining a historical engagement time of an online user; (b) identifying a plurality of online content items, each online content item of the plurality of online content items having a target engagement time; (c) receiving a request for a content item, wherein the request is associated with the online user; (d) selecting a first online content item from the plurality of online content items based at least in part on the historical engagement time of the online user and the target engagement time of the first online content item; (e) transmitting the first online content item for display to the online user; (f) determining an average time that the online user engaged with one or more historical online content items; (g) determining average time that the online user engaged with one or more historical online content items within a category of historical online content items; (h) determining the historical engagement time based at least in part on time spent by the online user viewing a video ad before abandoning the viewing; (i) selecting an online content item is based at least in part on having an associated target engagement time near the historical engagement time; (j) receiving the target engagement times of the plurality of online content items from a plurality of associated online content providers; and (k) determining an actual engagement time of the online user engaging with the first online content item, and determining a cost associated with providing the first online content item based at least in part on the actual engagement time and the target engagement time.

The resulting technical effect achieved by this system is at least one of: (i) matching online content items with users that are likely to consume a pre-determined amount of the content item; (ii) enabling advertisers to identify a target engagement time for their ads; and (iii) modifying advertising compensation based on user engagement. Thus, the system is better able to serve relevant online content items to users, which results in a better user experience with the network and reduces the amount of only partially consumed content items that are transmitted over the network. Accordingly, the systems and methods described herein improve the technical field of content serving. For example, the operation of the network, the computing devices transmitting the online content, and the computing devices receiving the content item is improved. More specifically, by transmitting online content items that are more likely to be viewed by users in their entirety, the systems and methods reduce the likelihood that network and processing resources will be unnecessarily allocated to transmit and process data that will not be fully utilized by users (e.g., online content items that will not be viewed in their entirety), and instead will be available to transmit and process other data.

The following detailed description illustrates embodiments of the disclosure by way of example and not by way of limitation. It is contemplated that the disclosure has general application to the presentation and valuation of content items such as online advertisements during presentation of publications such as online web pages.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Figure 1:
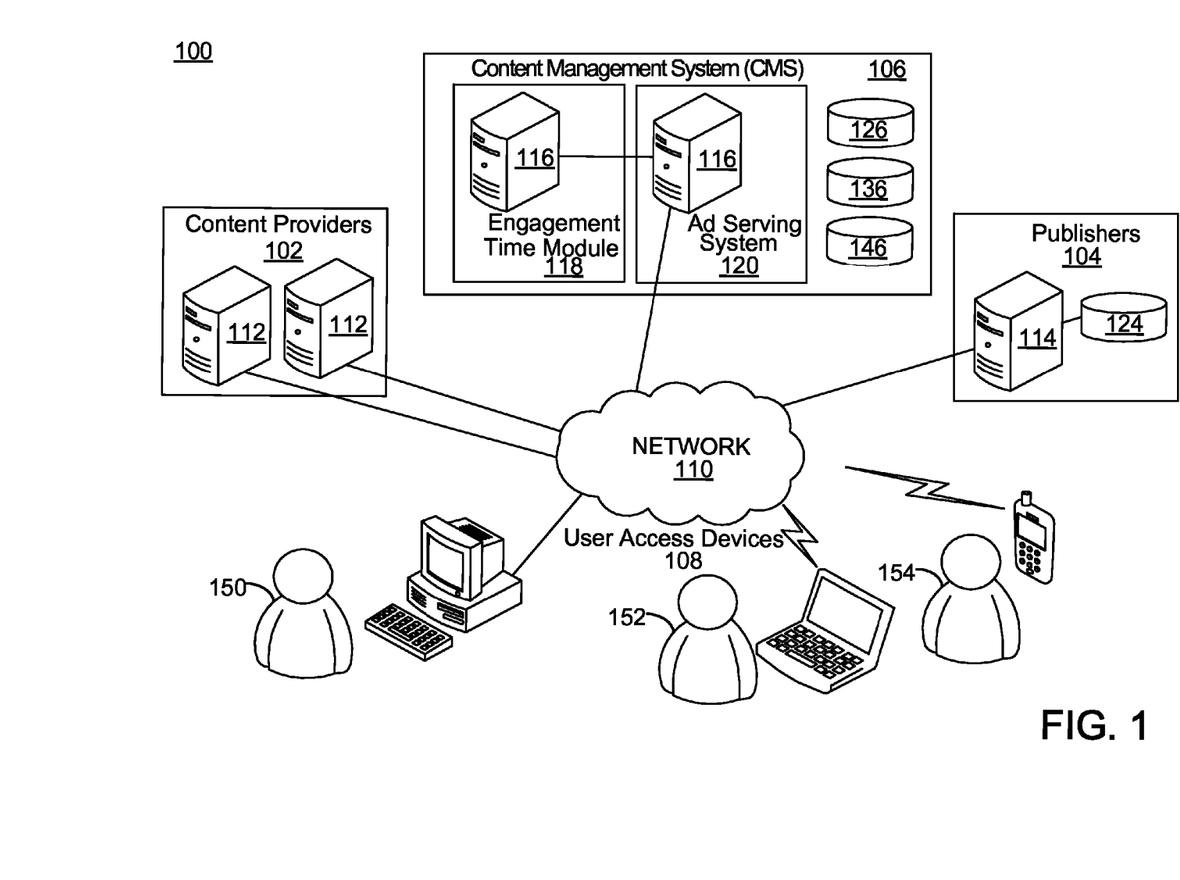
FIG. 1 is a diagram showing an example networked environment for serving online content based on user engagement duration.

FIG. 1 is a diagram showing an example networked environment 100 for serving online content based on user engagement duration. With reference to FIG. 1, an example networked environment 100 may include one or more content providers 102 (alternatively referred to herein as merchants), one or more publishers 104, a content management system (CMS) 106, and one or more user access devices 108 ("client computing devices" or just "client devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with servers, software processes and engines, and/or various embedded systems. The elements 102, 104, 106 and 110 may serve, for example, as a content bidding and distribution network. In the example embodiment, content providers 102 include online advertisers, and CMS 106 is an advertising management system that enables presentation of online content based on user engagement duration.

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts. In some embodiments, content providers 102 provide content items that include, for example, audio and/or video advertisements.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression, also referred to herein as an advertisement, or "ad." A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

In some embodiments, one or more ads are affiliated with an "ad group." An ad group includes one or more ads along with other associated information related to those ads, such as, for example and without limitation, a title, a headline, a budget, targeting criteria, and keywords. In the example embodiment, an ad group includes one ad and associated information. As used herein, the term "ad" and "ad group" may be used interchangeably, as some operations that are performed relative to an ad may also be performed relative to an ad group, and vice versa.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, review, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems. In some embodiment, some content providers 102 review online content items using, for example, systems 112 and/or CMS 106.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154. In still other examples, the publishers 104 may provide online content space for sale to advertisers, such as content providers 102. Such content space may be populated with content items from the content providers 102, and may be presented to the user 150, 152, or 154 along with the publications.

As noted above, one or more of the publishers 104 may represent a publication network. In such an implementation, the content providers 102 may be able to present content to users through this publication network. Further, in some embodiments, content providers 102 bid on online content items, for example, through CMS 106.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information. Additionally, in some embodiments, publishers 104 and/or content providers 102 may review online content items using, for example, system 114 and/or CMS 106.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and an engagement time module (ETM) 118. The content serving system 120 may include one or more data processing systems 116 and may perform functionality associated with delivering content to publishers or user access devices 108. The ETM 118 may include one or more data processing systems 116 and may perform functionality associated with identifying relevant content to deliver, processing various rules, performing filtering processes, generating reports, maintaining accounts and usage information, auctioning online content items, and other backend system processing. The CMS 106 can use the ETM 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query. Searching modules may also store search results including one or more of search query terms, search results elements, and ads impressions served.

The CMS 106 may include one or more interface or frontend modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, and review content items as described herein.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-through's for content as well as the ratio of click-through's to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

In some embodiments, the CMS 106 and/or ETM 118 serve online content based on engagement durations. For example, ETM 118 determines historical engagement times for one or more users 150, 152, 154. ETM 118 also receives online content items and associated target engagement times from content providers 102. While serving content to the one or more users 150, 152, 154, ETM 118 compares historical engagement times of a consuming user (e.g., user 150) to target engagement times of a pool of ads and determines which ad from the pool to serve to the user. In some embodiments, the ETM 118 stores the user's engagement time with content items in an anonymized form. In at least some embodiments, a user has the option to consent to or decline having the ETM 118 store their engagement time with content items. Additionally, in at least some embodiments, the system stores the user's browsing history in an anonymized form or enables the user to consent to or decline having their browsing history stored by the system.

Figure 2:
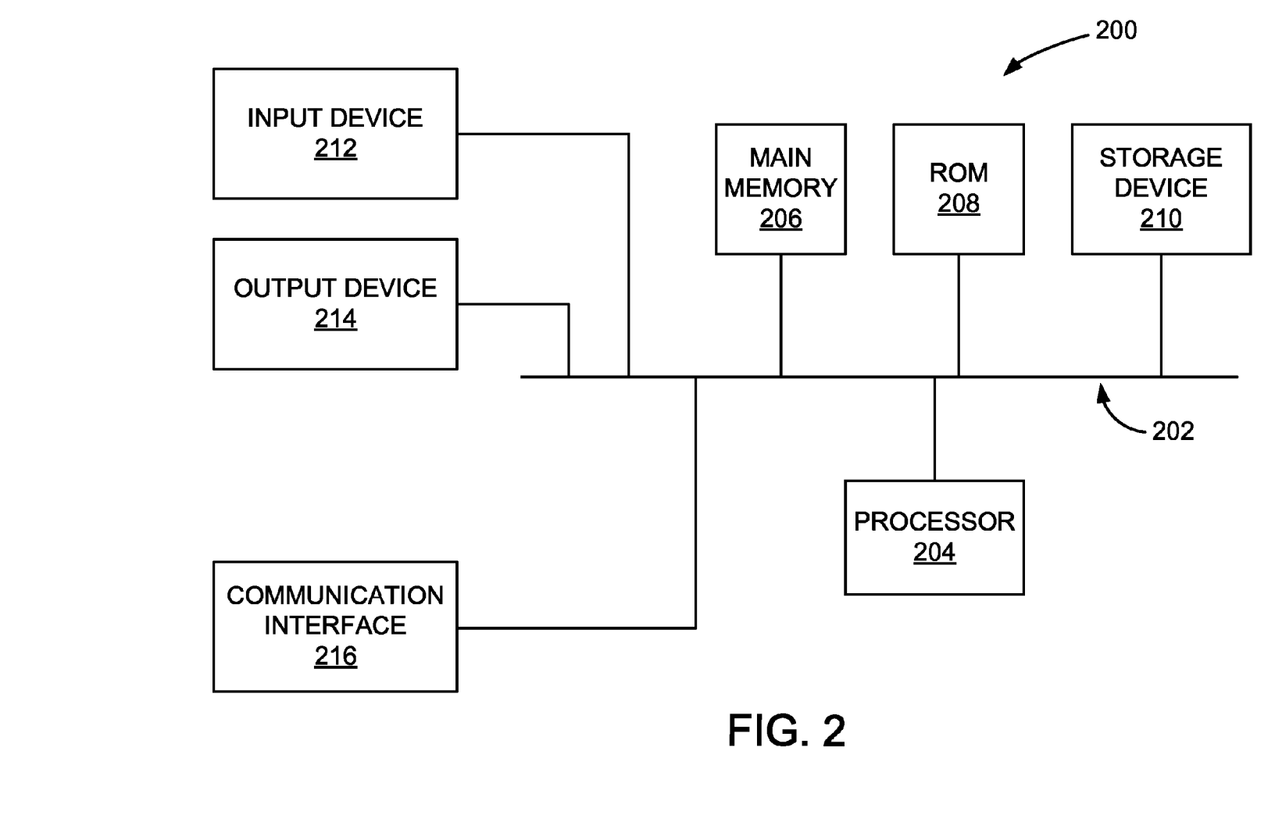
FIG. 2 is a block diagram of a computing device that may be used to serve online content based on user engagement duration.

FIG. 2 is a block diagram of a computing device 200 that may be used to serve online content based on user engagement duration. In the example embodiment, computing device could be any of the computing devices shown in FIG. 1, such as, for example, user access device 108, ETM 118, or CMS 106. FIG. 2 shows an example of a computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, tablet computers, digital e-book readers, and other similar computing devices that could be used for displaying publications and/or content items to a user. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 2), wherein it is specifically configured to perform one or more of the steps described herein. In the example embodiment, computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system). In some embodiments, processor 204 is transformed into a special purpose microprocessor by executing computer-executable instructions or by otherwise being programmed.

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or cloud-based storage or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the serving of online content items based on user engagement. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, Wi-Fi, or other such transceiver (not shown). In addition, a GPS (Global Positioning system) receiver module may provide additional navigation- and location-related wireless data to device 200, which may be used as appropriate by applications running on device 200.

Computing device 200 may also communicate audibly using an audio codec, which may receive spoken information from a user and convert it to usable digital information. The audio codec may likewise generate audible sound for a user, such as through a speaker, e.g., in a handset of device. Such sound may include sound from voice telephone calls, may include recorded sound (e.g., voice messages, music files, etc.) and may also include sound generated by applications operating on computing device 200.

Computing device 200 may be implemented in a number of different forms. For example, it may be implemented as a cellular telephone, or as part of a smart phone, personal digital assistant, a computer tablet, or other similar mobile device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 200) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing device 200 is configured to serve online content items based on user engagement or consumption of historical content items served to that user. In some embodiments, computing device 200 is the ETM 118 shown in FIG. 1.

Figure 3:
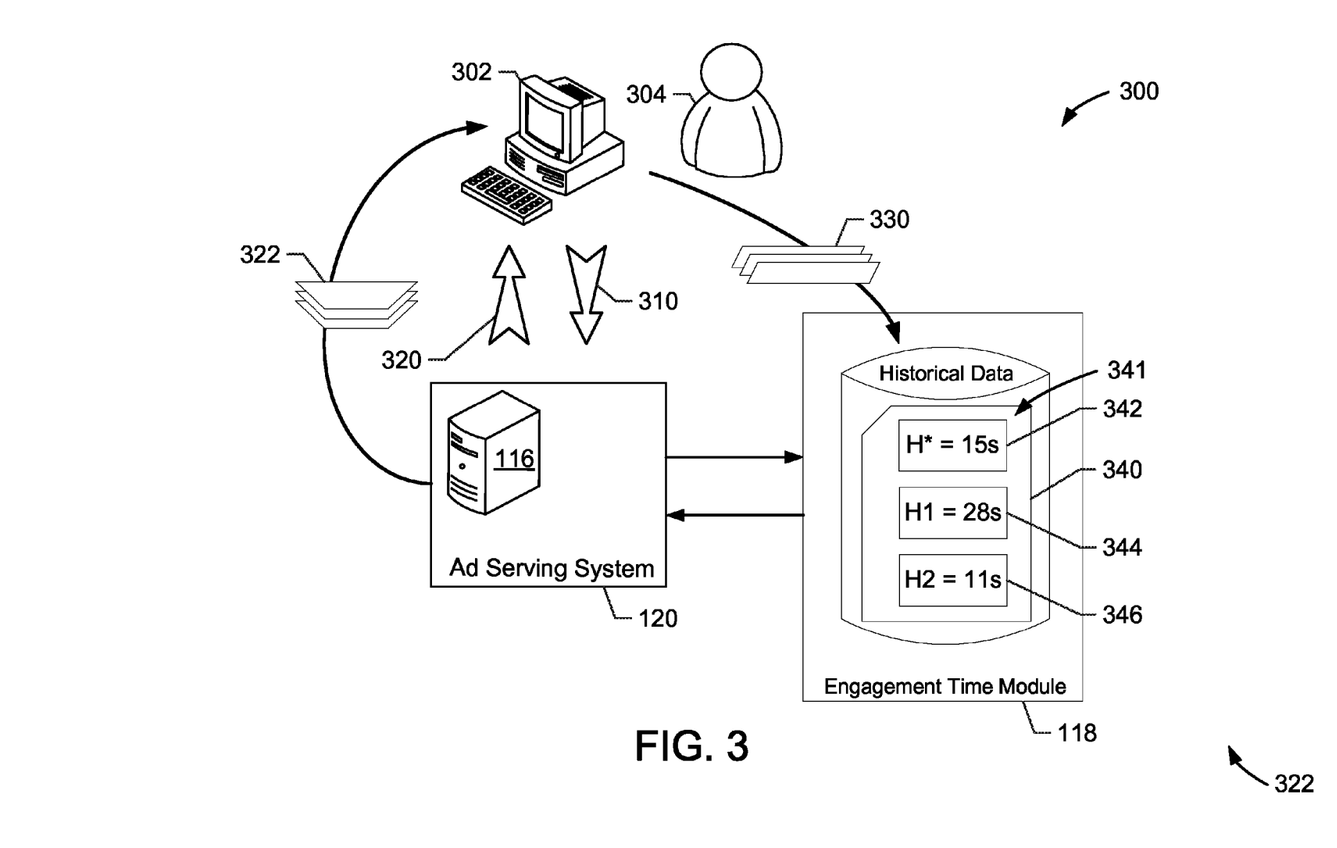
FIG. 3 is a diagram of an example content serving environment including an ad serving system which may be used to provide online content items to a consuming user through a computing device.

FIG. 3 is a diagram of an example content serving environment 300 including an ad serving system 120 which may be used to provide online content items to a consuming user 304 through a computing device 302. In some embodiments, content serving environment 300 may be similar to networked environment 100, user 304 may be similar to users 150, 152, and 154, and computing device 302 may be similar to computing devices 108 (all shown in FIG. 1).

In the example embodiment, user 304 is an online user consuming online publications in an online environment in which a plurality of ad requests 310 are generated and directed to ad serving system 120. Ad serving system 120 responds 320 to computing device 302 by providing a plurality online content items (e.g., "ads") 322 to computing device 302. The plurality of ads 322 are viewed, or "consumed", by user 304. In some embodiments, ads 322 are video ads that user 304 watches prior to or contemporaneously with the consumption of another online publication. For example, in some environments, an ad 322 is provided prior to or during the presentation of a video publication desired by user 304.

In the example embodiment, a engagement time module (ETM) 118 receives consumption data from computing device 302. This consumption data is associated with the users' 304 consumption of ads 322. More specifically, ETM receives or otherwise determines engagement times 330 that indicate how long (e.g., a duration in units of time) the user 304 engaged with (e.g., watched) an ad 322. For example, user 304 may request a video publication in an online video presentation environment, and that video presentation environment may present an ad 322 prior to presentation of the requested video publication. User 304 may watch all, or only a portion, of ad 322, thereby generating an engagement time 330 associated with that user 304 and that ad 322.

ETM 118, in the example embodiment, generates an engagement history 340 associated with user 304 over a plurality of ad viewings. More specifically, ETM 118 computes one or more historical engagement times 341 for user 304 based at least in part on engagement times 330. In some embodiments, ETM 118 computes an aggregate, "uncategorized" engagement time 342 for user 304. For example, ETM 118 may compute an average engagement time 342 based on all engagement times for the user (e.g., regardless of the content type of ads 322). In the example shown in FIG. 3, user 304 has an uncategorized engagement time 342 "H*"=15 seconds. In other words, not considering tendencies based on the content of ads, user 304 has a tendency to consume approximately 15 seconds of ads presented to him/her before abandoning the content.

In some embodiments, ETM 118 computes categorized engagement times 344, 346 for user 304. Ads 322 may be categorized by content type, and engagement times 330 may be associated not only with particular ads 322, but with particular ad categories. For example, some ads 322 may be categorized as related to the sport of golf, and other ads 322 may be categorized as related to footwear. As such, ETM 118 may compute a categorized engagement time 344 associated with just engagement times 330 related to the viewing of golf-related ads (e.g., the ads 322 categorized under "golf"), as well as a categorized engagement time 346 associated with just engagement times 330 related to the viewing of footwear-related ads (e.g., the ads 322 categorized under "footwear"). In the example shown in FIG. 3, user 304 has a golf engagement time 344 of 28 seconds, and a footwear engagement time 346 of 11 seconds. This may indicate, for example, that In some embodiments, engagement times 341 may be time-limited, such as an aggregation of all engagement times within the last month, or all engagement times during a given time period.

Figure 4:
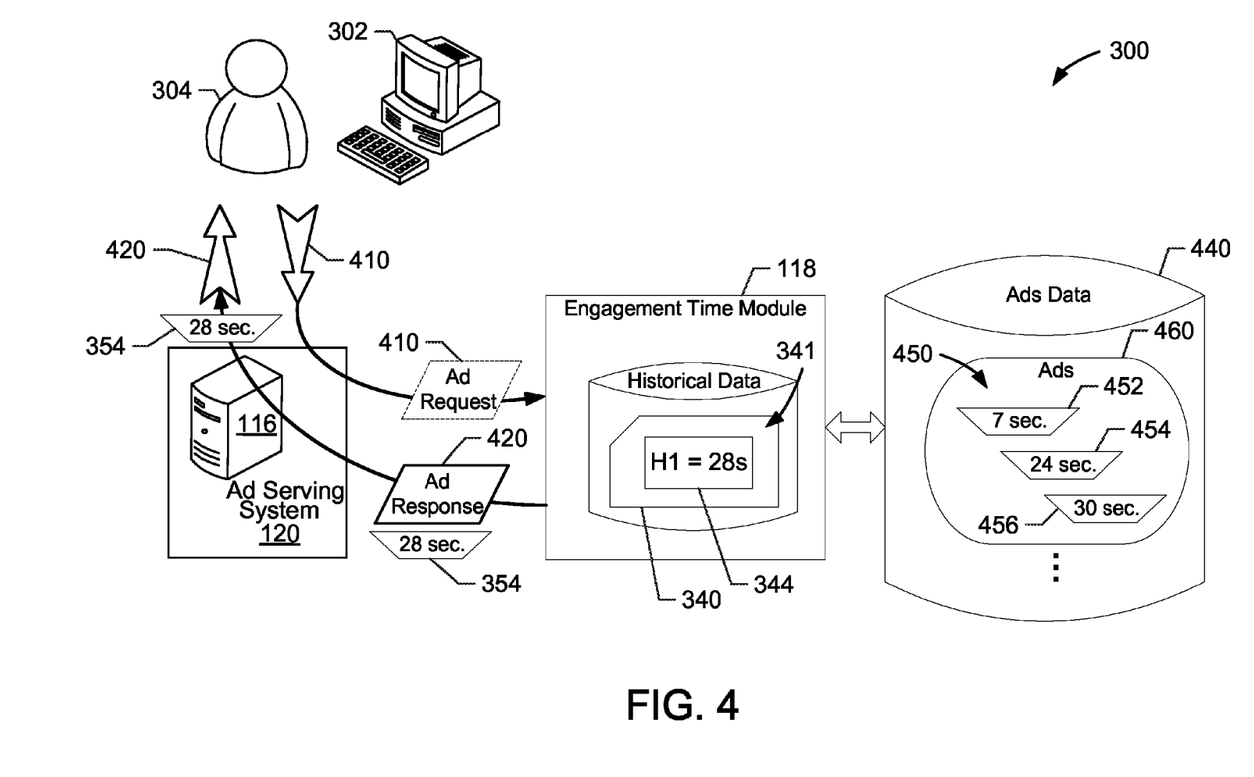
FIG. 4 is a diagram of the example content serving environment shown in FIG. 3 in which the engagement time module (ETM) provides online content items (e.g., ads) to a user based at least in part on engagement times determined from historical engagement by the user with content items.

FIG. 4 is a diagram of the example content serving environment 300 shown in FIG. 3 in which ETM 118 provides online content items (e.g., ads 450) to user 304 based at least in part on engagement times 341 determined from historical engagement with content items. In the example embodiment, ETM 118 is in communication with a database having ads data 440. Ads data 440 includes a plurality of ads 450, and each ad 450 has an associated target engagement time (e.g., provided by the advertiser). Further, in the example embodiment, ads data 440 also includes one or more ads categories, such as "golf ads" or "footwear ads". Ads 450 may be assigned to one or more of these ads categories. In the example shown in FIG. 4, ads data 440 includes a pool of golf-related ads 460 that includes three golf-related ads 450: a first ad 452 has a target engagement time of 7 seconds, a second ad 454 has a target engagement time of 24 seconds, and a third ad 456 has a target engagement time of 30 seconds.

In the example embodiment, user 304 requests an online publication such as a web site or an online video. In conjunction with the online publication request, an ad request 310 is generated and transmitted to ad serving system 120. In the example embodiment, ETM 118 receives an ad request 410 associated with user 304 and/or computing device 302 (e.g., via ad serving system 120). ETM 118 identifies engagement history 340 associated with user 304 and, more specifically, selects an historical engagement time 341.

In some embodiments, ETM 118 selects an uncategorized engagement time 342 (shown in FIG. 3). In the example embodiment, ETM 118 receives, determines, or otherwise identifies a category associated with ad request 410, such as "golf", and selects a categorized engagement time for that category. For example, ad serving system 120 may determine the category when first receiving request 410 based on historical interest data associated with user 304 and/or computing device 302. ETM 118 thus selects the "golf-related" historical engagement time 344 of user 304 from engagement history. In some embodiments, if no "golf-related" historical engagement time 344 is present for user 304, ETM 118 may select a different engagement time 340. For example, ETM 118 may select uncategorized engagement time 342 as a "default" engagement time when another more appropriate engagement time 340 is not available. In other embodiments, ETM 118 may determine an engagement time 340 that is somehow related or similar to the category. In one embodiment, for example, ETM 118 examines a hierarchy of ad categories and selects an engagement time 340 associated with an ancestor or descendent of the category. For example, the hierarchy may define "golf" as a child of "outdoor sports", and "outdoor sports" as a child of "sports". As such, if a "golf" historical engagement time 344 is not available for user 304, but an "outdoor sports" or a "sports" historical engagement time is available for user 304, ETM may select one of these (e.g., the nearest available ancestor or descendent) to use as historical engagement time.

ETM 118 also identifies a pool of ads 450 from which to select an ad for ad request 410. In the example embodiment, a category (e.g., "golf") is associated with ad request 410 and, as such, ETM 118 identifies a pool of golf-related ads 460. As shown in FIG. 4, pool 460 includes first ad 452 having a target engagement time of 7 seconds, a second ad 454 having a target engagement time of 24 seconds, and a third ad 456 has a target engagement time of 30 seconds.

In the example embodiment, ETM 118 selects an ad from the identified pool of ads 460. More specifically, ETM 118 selects an ad from pool of ads 460 based at least in part on the selected historical engagement time (e.g., the "golf-related" historical engagement time 344) and the target engagement times of ads in pool 460. In some embodiments, ETM 118 selects the ad having a target engagement time nearest the selected historical engagement time. For example, ETM 118 may select ad 456 because there is only 2 seconds difference between historical engagement time 344 of 28 seconds and the target engagement time of 30 seconds for ad 456. In other embodiments, ETM 118 selects the ad having the nearest target engagement time that is less than the selected historical engagement time. For example, ETM 118 may not select ad 456 because the target engagement time is more than historical engagement time 344, and may instead select ad 454 because it is the ad having the nearest target engagement time to the selected historical engagement time 344 of 28 seconds (e.g., only 4 seconds difference).

Once ETM 118 selects an ad from ads data 40 (e.g., from pool of ads 460), in the example embodiment, ETM 118 generates a response 420 to ad request 410 and transmits ad 354 to ad serving system and/or computing device 302 for presentation to user 304. As such, ETM 118 responds to ad request 410 in such a way as to increase a likelihood that the viewing user 304 will consume the ad through to at least the point at which, for example, the advertiser's most important message has been delivered.

In some embodiments, advertisers may participate in an auction environment for providing ads to users (e.g., for their ad to be presented in response to ad request 410). For example, ad serving system 120 and/or ETM 118 may provide auctions to advertisers for ad requests 410. ETM 118 may consider historical engagement times 341 (shown in FIG. 3) and/or target engagement times of ads 450 during an auction for ad request 410. For example, ETM 118 may produce a likelihood or "engagement time prediction value" that user 304 is going to engage with an ad (e.g., ad 454) for that ads target engagement time (e.g., 24 seconds). This engagement time prediction value may be used, for example, as a multiplier in the auction. As such, ads that are more likely to be fully consumed by user 304 are more likely to win the auction (e.g., be selected by ETM 118 as the ad provided by ad response 420).

In some embodiments, ETM 118 computes an engagement time prediction value using a user clustering mechanism. ETM 118 identifies metadata about the user, past ads, and browsing history the user has engaged with, and identifies a cluster of users who engage with similar content. ETM 118 counts the percentage of users who, when they engaged with the ad (or a similar ad based on metadata), engaged for the target engagement time.

In some embodiments, individual impression prices may be variable and depend on the total available or predicted inventory (e.g., based on the above-described engagement time prediction). In some embodiments, the price per impression may be fixed, and bids may be suggested to the advertiser based on the engagement that the advertiser picks.

In some embodiments, ETM 118 may present a count of users or impressions that may be reachable. This data may assist advertisers when considering target engagement times for a give ad. Further, in some embodiments, ETM 118 and/or ad serving system 120 may alter an amount billed to advertisers based on target engagement time. For example, advertisers may be billed an additional amount if the user subsequently engages with the provided ad for at least the associated target engagement time.

Figure 5:
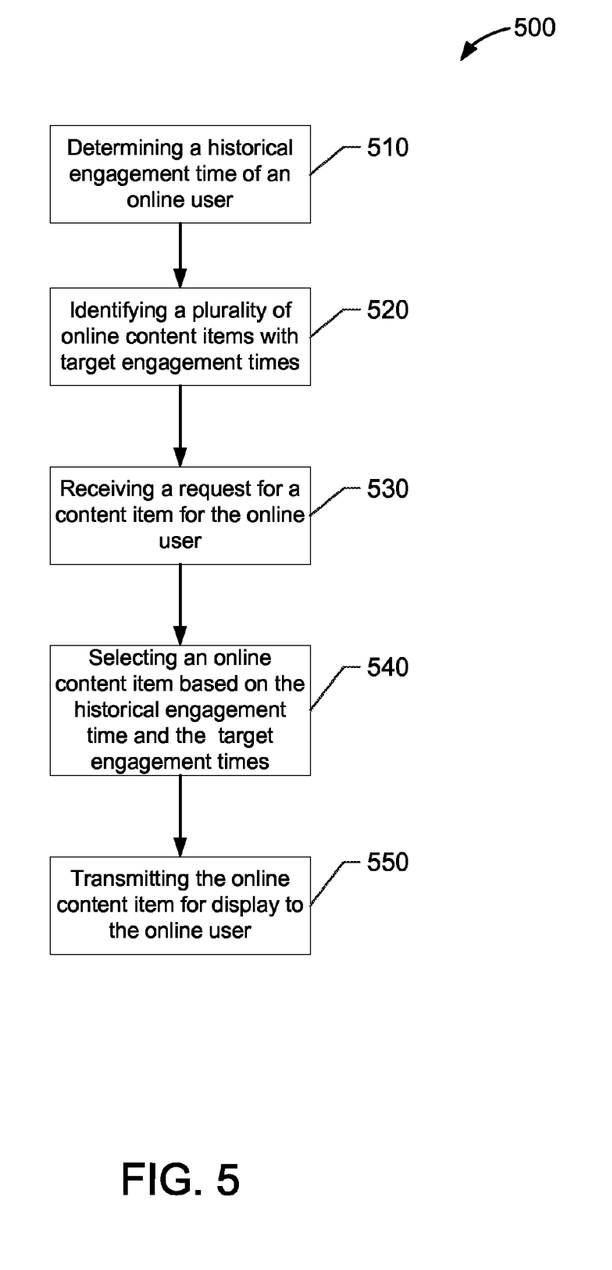
FIG. 5 is an example method for serving online content to a user based user engagement duration (e.g., historical engagement time).

FIG. 5 is an example method 500 for serving online content to a user based user engagement duration (e.g., historical engagement time). In the example embodiment, method 500 is a computer-implemented method practiced in environment 100 (shown in FIG. 1) using one or more computing devices such as user access devices 108 (shown in FIG. 1), ad serving system 120 (shown in FIG. 1), ETM 118 (shown in FIG. 1), content provider system 112 (shown in FIG. 1), publisher system 114, and/or computing device 404 (shown in FIG. 4), and includes at least one processor and a memory. Method 500 includes determining 510 a historical engagement time of an online user. Method 500 also includes identifying 520 a plurality of online content items, each online content item of the plurality of online content items having a target engagement time. Method 500 also includes receiving 530 a request for a content item, wherein the request is associated with the online user. Method 500 also includes selecting 540, by the processor, a first online content item from the plurality of online content items based at least in part on the historical engagement time of the online user and the target engagement time of the first online content item. Method 500 also includes transmitting 550 the first online content item for display to the online user.

In some embodiments, determining 510 a historical engagement time further includes determining an average time that the online user engaged with one or more historical online content items. In some embodiments, determining 510 a historical engagement time further includes determining average time that the online user engaged with one or more historical online content items within a category of historical online content items. In some embodiments, determining 510 the historical engagement time further includes determining the historical engagement time based at least in part on time spent by the online user viewing a video ad before abandoning the viewing. In some embodiments, selecting 540 an online content item is further based at least in part on having an associated target engagement time near the historical engagement time. In some embodiments, method 500 also includes receiving the target engagement times of the plurality of online content items from a plurality of associated online content providers. In some embodiments, method 500 also includes determining an actual engagement time of the online user engaging with the first online content item, and determining a cost associated with providing the first online content item based at least in part on the actual engagement time and the target engagement time.

Figure 6:
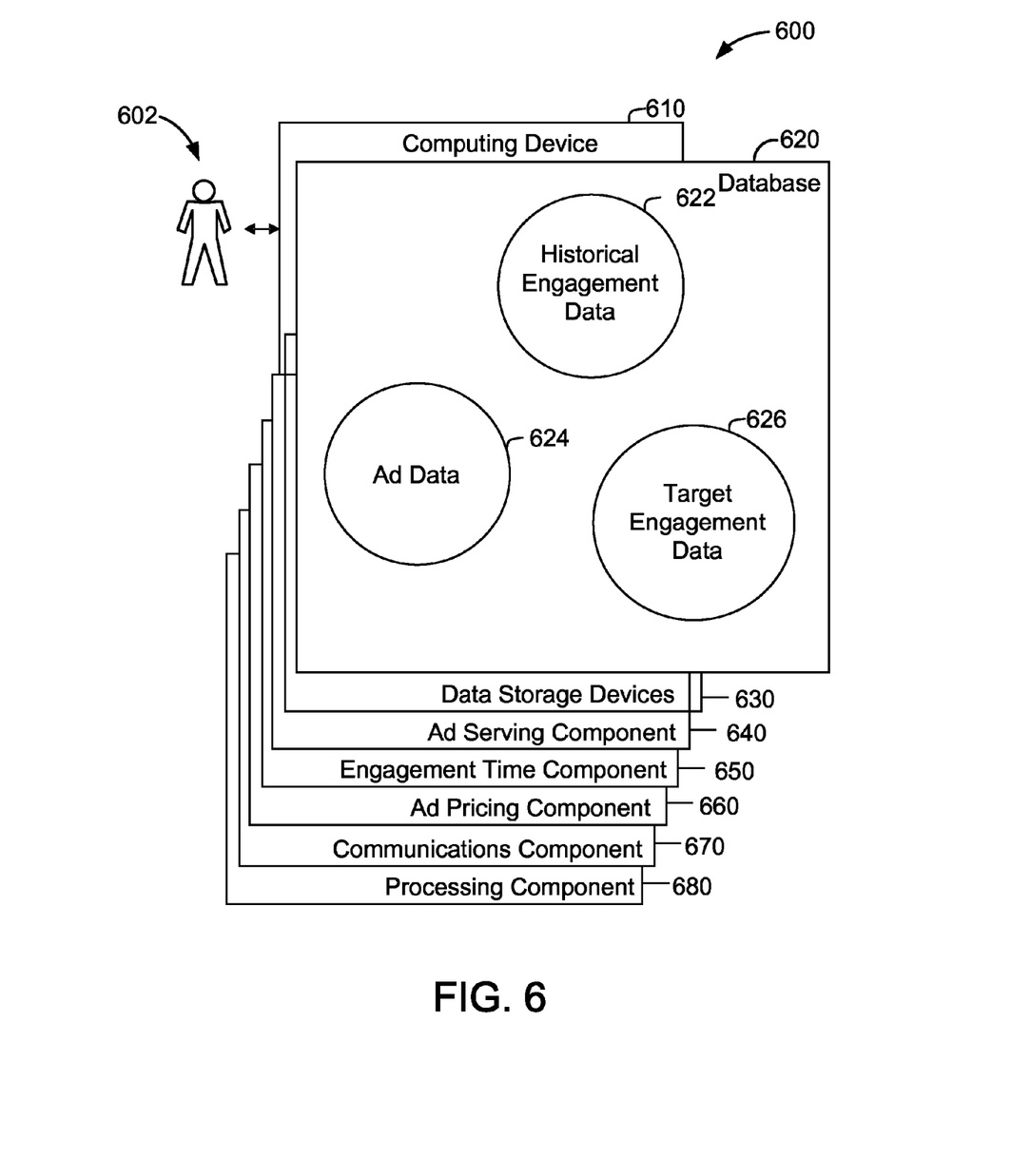
FIG. 6 shows an example configuration of a database within a computing device, along with other related computing components, that may be used for serving online content to a user based user engagement duration.

FIG. 6 shows an example configuration 600 of a database 620 within a computing device 610, along with other related computing components, that may be used for serving online content to a user based user engagement duration. Computing device 610 may operate in a networked environment such as environment 100 (shown in FIG. 2). In some embodiments, computing device 610 is similar to user access devices 108 (shown in FIG. 1), ETM 118 (shown in FIG. 1), ad serving system 120 (shown in FIG. 1), content provider system 112 (shown in FIG. 1), publisher system 114, and/or computing device 302 (shown in FIG. 3). Database 620 is coupled to several separate components within computing device 610, which perform specific tasks.

In the example embodiment, database 620 includes historical engagement data 622, ad data 624, and target engagement data 626. Historical engagement data 622 includes information associated with past user engagement with various served ads and their particular categories, as well as historical engagement times. Ad data 624 includes information associated with ads provided to requesting users. Target engagement data 526 includes data associated with target engagement times associated with ads.

Computing device 610 includes the database 620, as well as data storage devices 630. Computing device 610 also includes an ad serving component 640 for managing ad requests from user computing devices. Computing device 610 also includes an engagement time component 650 for determining historical engagement times and for selecting ads based on historical engagement times. Computing device 610 also includes an ad pricing component 660 for determining prices for impressions served based on actual engagement times and/or target engagement times. A communications component 670 is also included for communicating with other servers or entities during collection and analysis. A processing component 680 assists with execution of computer-executable instructions associated with the system.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the embodiments or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" "retrieving" "receiving" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

While the disclosure has been described in terms of various specific embodiments, it will be recognized that the disclosure can be practiced with modification within the spirit and scope of the claims.

What is claimed is:

1. A content serving computer system for serving online content based on user engagement duration, the content serving computer system comprising:
at least one memory; and
one or more processors configured to:
receive consumption data associated with an application of a user access device of an online user comprising, for each of a plurality of served online content items, a duration that the application displayed said served online content item before navigating away from said online content item;
determine a historical engagement time of the online user as an average engagement time for the online user from the consumption data, wherein the historical engagement time is an average duration that the application of the user access device of the online user displayed said served online content items before navigating away from the online content items;
identify a plurality of online content items, each online content item of the plurality of online content items having a target engagement time associated therewith;
receive a request for a content item from the user access device, wherein the request is associated with the online user;
select a first online content item from the plurality of online content items having a target engagement time less than the historical engagement time of the online user; and
transmit the first online content item to the user access device for display to the online user, the application displaying the first online content item for a duration less than the historical engagement time of the online user.

2. The content serving computer system of claim 1, wherein the plurality of served online content items are associated with a first category, wherein the average engagement time is associated with the first category, and wherein the one or more processors are further configured such that identifying a plurality of online content items further includes identifying a plurality of online content items associated with the first category.

3. The content serving computer system of claim 2, wherein the one or more processors are further configured such that receiving a request for a content item further includes identifying a first category associated with the request, and identifying a plurality of online content items further includes identifying a plurality of online content items associated with the first category.

4. The content serving computer system of claim 2, wherein the one or more processors are further configured such that selecting a first online content item further includes selecting a first online content item having a first engagement time that is less than the historical engagement time.

5. The content serving computer system of claim 2, wherein the one or more processors are further configured such that selecting a first online content item further includes selecting a first online content item from the plurality of online content items having an engagement time nearest the historical engagement time.

6. The content serving computer system of claim 2, wherein the one or more processors are further configured such that selecting a first online content item further includes selecting a first online content item from the plurality of online content items having an engagement time that is less than the historical engagement time and nearest historical engagement time.

7. The content serving computer system of claim 2, wherein the one or more processors are further configured to:
determine an actual engagement time of the online user engaging with the first online content item; and
determine a cost associated with providing the first online content item based at least in part on the actual engagement time and the target engagement time.

8. A computer-implemented method for serving online content based on user engagement duration, said method comprising:
receiving, by a content serving computer device, consumption data associated with an application of a user access device of an online user comprising, for each of a plurality of served online content items, a duration that the application displayed said served online content item before navigating away from said online content item;
determining, by the content serving computer device, a historical engagement time of the online user as an average engagement time for the online user from the consumption data, wherein the historical engagement time is an average duration that the application of the user access device of the online user displayed said served online content items before navigating away from the online content items;
identifying, by the content serving computer device, a plurality of online content items, each online content item of the plurality of online content items having a target engagement time associated therewith;
receiving, by the content serving computer device, a request for a content item from the user access device, wherein the request is associated with the online user;
selecting, by the content serving computer device, a first online content item from the plurality of online content items having a target engagement time less than the historical engagement time of the online user; and
transmitting, by the content serving computer device, the first online content item for display to the online user, the application displaying the first online content item for a duration less than the historical engagement time of the online user.

9. The method of claim 8, wherein the plurality of served online content items are associated with a first category, wherein the average engagement time is associated with the first category, wherein identifying a plurality of online content items further includes identifying a plurality of online content items associated with the first category.

10. The method of claim 8, wherein receiving a request for a content item further includes identifying a first category associated with the request, wherein identifying a plurality of online content items further includes identifying a plurality of online content items associated with the first category.

11. The method of claim 8, wherein selecting a first online content item further includes selecting a first online content item having a first engagement time that is less than the historical engagement time.

12. The method of claim 8, wherein selecting a first online content item further includes selecting a first online content item from the plurality of online content items having an engagement time nearest the historical engagement time.

13. The method of claim 8, wherein selecting a first online content item further includes selecting a first online content item from the plurality of online content items having an engagement time that is less than the historical engagement time and nearest historical engagement time.

14. The method of claim 8, further comprising:
determining an actual engagement time of the online user engaging with the first online content item; and
determining a cost associated with providing the first online content item based at least in part on the actual engagement time and the target engagement time.

15. Non-transitory computer-readable storage media having computer-executable instructions embodied thereon, wherein, when executed by at least one processor, the computer-executable instructions cause the processor to:
receive consumption data associated with an application of a user access device of an online user comprising, for each of a plurality of served online content items, a duration that the application displayed said served online content item before navigating away from said online content item;
determine a historical engagement time of the online user as an average engagement time for the online user from the consumption data, wherein the historical engagement time is an average duration that the application of the user access device of the online user displayed said served online content items before navigating away from the online content items;
identify a plurality of online content items, each online content item of the plurality of online content items having a target engagement time associated therewith;
receive a request for a content item from the user access device, wherein the request is associated with the online user;
select a first online content item from the plurality of online content items having a target engagement time less than the historical engagement time of the online user; and
transmit the first online content item to the user access device for display to the online user, the application displaying the first online content item for a duration less than the historical engagement time of the online user.

16. The computer-readable storage media of claim 15, wherein the plurality of served online content items are associated with a first category, wherein the average engagement time is associated with the first category, and further comprising computer-executable instructions such that identifying a plurality of online content items further includes identifying a plurality of online content items associated with the first category.

17. The computer-readable storage media of claim 16, further comprising computer-executable instructions such that receiving a request for a content item further includes identifying a first category associated with the request, and identifying a plurality of online content items further includes identifying a plurality of online content items associated with the first category.

18. The computer-readable storage media of claim 15, further comprising computer-executable instructions such that selecting a first online content item further includes selecting a first online content item having a first engagement time that is less than the historical engagement time.

19. The computer-readable storage media of claim 15, further comprising computer-executable instructions such that selecting a first online content item further includes selecting a first online content item from the plurality of online content items having an engagement time nearest the historical engagement time.

20. The computer-readable storage media of claim 15, further comprising computer-executable instructions such that selecting a first online content item further includes selecting a first online content item from the plurality of online content items having an engagement time that is less than the historical engagement time and nearest historical engagement time.

* * * * *